June 26, 1945.   H. L. COLLINS   2,378,912
WORK HOLDING DEVICE
Filed June 16, 1943   3 Sheets-Sheet 1

Inventor
HOPE LEWIS COLLINS
By Barthel + Bugbee
Attorney

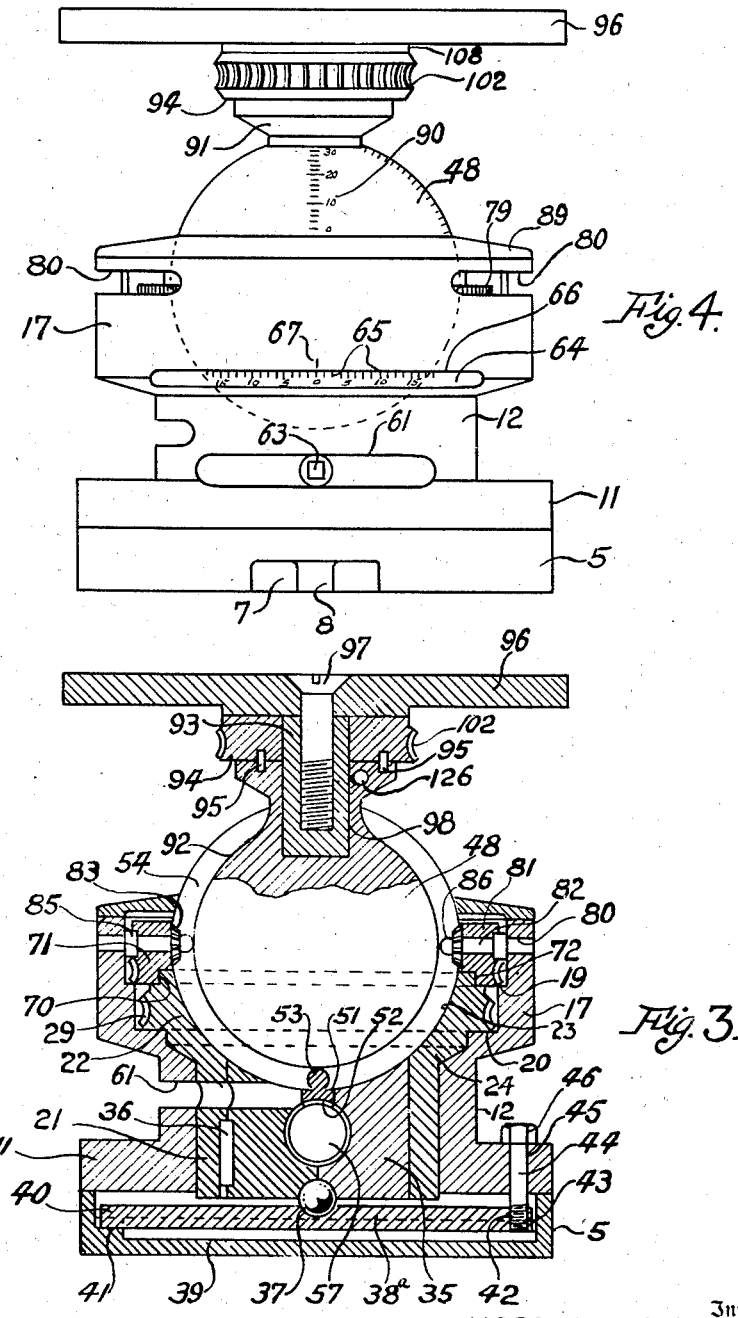

June 26, 1945.  H. L. COLLINS  2,378,912
WORK HOLDING DEVICE
Filed June 16, 1943  3 Sheets-Sheet 3
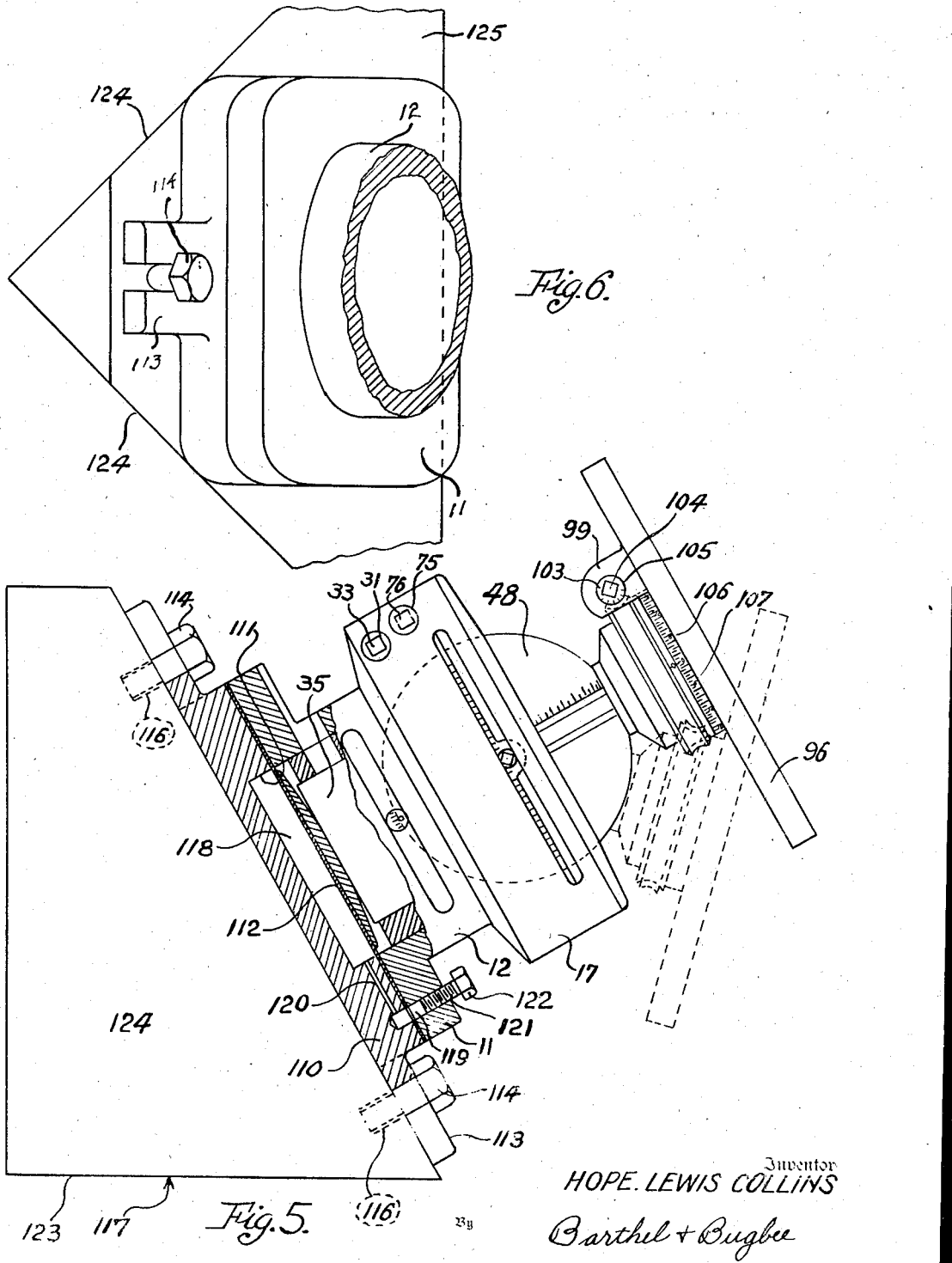
Inventor
HOPE. LEWIS COLLINS
Barthel + Bugbee
Attorney Patented June 26, 1945

2,378,912

UNITED STATES PATENT OFFICE 2,378,912

WORK HOLDING DEVICE

Hope Lewis Collins, Ferndale, Mich.

Application June 16, 1943, Serial No. 491,045

20 Claims. (Cl. 90—59)

The present invention relates to improvements in work holders, and more particularly, to a work holder capable of universal adjustment.

The primary object of the invention is to provide a work holder and support which may be easily and readily adjusted to various angular positions to present the work to the machine tool with a high degree of accuracy and precision.

Another object of the invention is to provide a work holder capable of universal movement in various directions to facilitate work being presented to the machine tool on a compound angle or an angle which is the resultant of the total of the various angular adjustments in two or more directions.

Another object of the invention is to provide a work holder as set forth in the preceding objects wherein the work may be moved to a position of nicety of adjustment and maintained in its predetermined adjusted position by clamping means associated with the work holder base without disturbing the adjustments previously made.

Another object of the invention is to provide a work holder of the above character in which compound and other difficult angles may be quickly and easily determined by multiple adjusting means and cooperating graduations so that the work may be accurately positioned and presented to a precision machine tool without requiring laborious calculation and computations on the part of the machinist.

Another object of the invention is to provide a work holder of the above mentioned character having a base member of angular formation to facilitate positioning of the work table at various predetermined angles without adjustment, or, if desired, the work holder may be adjusted to other angular positions from the predetermined angle of the base with the base angle as a starting or reference point.

Another object of the invention is to provide a work holder and support which may be adjusted to various angles with respect to the horizontal and vertical and which may be adjusted to other angular positions in succession from the horizontal and vertical positions to give a total angular position without necessitating reference to complicated charts such as sine, tangent and cosine tables.

Another object of the invention is to provide a universally adjustable work table and holder in which the work table may be adjusted independently of the support to facilitate movement of the work about an arc of 180° so that various faces of the work may be brought into the correct angular position with respect to the tool without disturbing the predetermined angular adjustments.

Another object of the invention is to provide a work holder in which the adjustments are made by means of worm and gear connections so that once the work holder is adjusted to a predetermined position, the worm and gear adjusting means will lock the work holder against accidental movement or displacement.

Another object of the invention is to provide a universally movable work holder which is composed of comparatively few parts to become worn and broken and which is constructed in an efficient and economical manner so that the parts will not become unduly worn or damaged in use.

Other objects and advantages of the invention will become apparent during the course of the following description of the accompanying drawings, where:

Figure 3 is a vertical cross sectional view taken at an angle of 90° from Figure 1 to further illustrate the arrangement of the various structural details embodied in the preferred form of the invention;

Figure 4 is a side elevational view of the work holder showing the location of the graduated adjusting members and the general appearance of the various elements;

Figure 2:
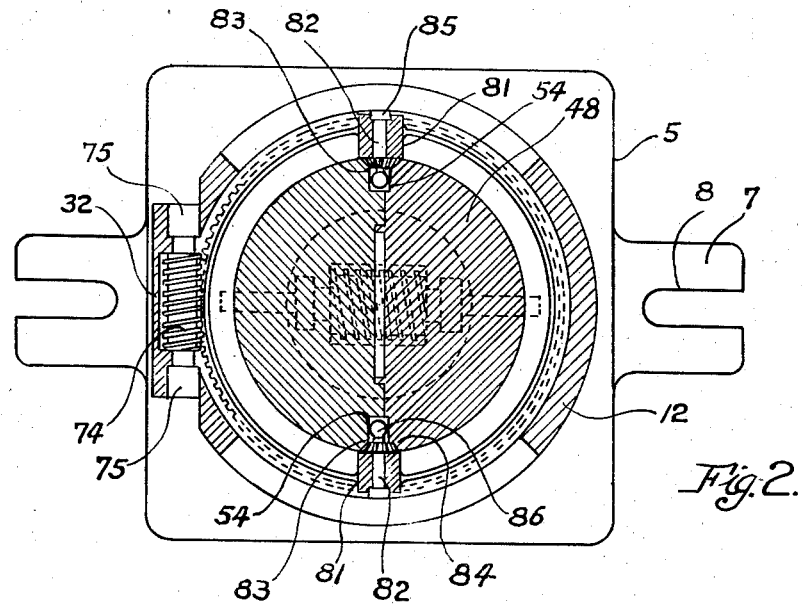
Figure 2 is a top plan view of the invention illustrating portions thereof in section to show the arrangement of the adjusting means.
Figure 1:
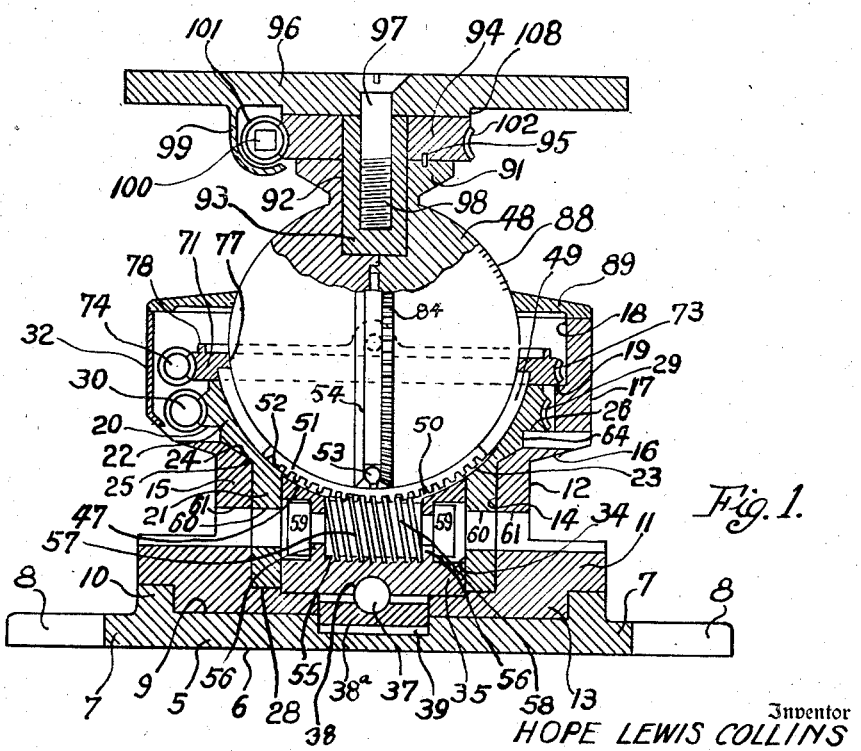
Figure 1 is a vertical cross-sectional view of a preferred embodiment of the invention showing the various structural details of the work holder and support.

Figure 5 is a side elevational view partly in section of a modified form of the invention illustrating an angled supporting block having a compound angle face and showing another form of clamping means for locking the work holder or table in a preadjusted position; and Figure 6 is a top plan view of the modified form of the invention shown in Figure 5 illustrating the work holder broken away to further show the formation of the angled base support.

Brief description of the invention

The invention broadly includes a work holder having a base provided with a rotatable socket member having a semi-spherical cavity for receiving a spherical support with means for rocking the spherical supporting member about its horizontal axis and means for rotating the spherical supporting member about its vertical axis whereby work may be supported on a work table adjustably secured to the spherical supporting member in an angular position as a resultant of the two component adjustments. Further, the invention provides for rocking movement of the spherical supporting member about its horizontal axis at approximately 90° from the movement on the first mentioned horizontal axis so that the component movements will result in positioning of the work table at an incline with respect to the machine tool which incline or angle would be extremely difficult to compute and determine. Also, the invention contemplates means for clamping the work holder and table in a preset position to prevent accidental movement thereof when the machine tool is operating on the work.

In the modified form of the invention, a fluid pressure operated clamping device is substituted for the clamping lever arrangement shown in Figures 1 to 4 inclusive and a unique and novel tool holder supporting base is provided for the tool holder so that work may be presented to the machine tool on compound angles without requiring adjustment or setting of the tool holder.

In the preferred and modified forms of the invention, the work holder structure is substantially the same and in each instance graduations are provided on the spherical member and the rotatable member having a spherical cavity therein so that the rotating worms of the various adjusting elements may be calibrated to provide a vernier adjustment for indicating fractional parts of degrees between the graduations on the spherical member and rotating member with the spherical cavity therein.

*Detailed description of the invention*

In the preferred embodiment of the invention shown in Figures 1 to 4 inclusive, the work holder comprises a base 5 having a relatively flat bottom wall or surface 6 for being received on a surface table or relatively flat machine bed. The base is provided with diametrically positioned and oppositely extending lugs 7 having slots 8 to enable the base to be bolted in place upon a surface table or work bed. Formed in the base 5 is a circular cavity 9 providing a marginal annular flange 10 into which is fitted a base portion 11 of a body casting 12. The base portion 11 is provided with a round extension 13 received in the circular recess 9 to facilitate the correct positioning and aligning of the parts such as the base member 5 and the casting base member 11 so that they may be held together by screws or the like. The tubular extension 12 is provided with a central opening 14 thereby forming a tubular section 15 having an outwardly flared section 16 and terminating in an upper section 17. The upper section 17 is substantially hollow and is provided with an enlarged bore 18 in alignment with the bore 14 and said bore 18 is reduced as at 19 and 20 to form annular seats for the movable parts of the work holder. Mounted in the annular extension 15 within the bore 14 thereof is a rotatable sleeve 21 having an enlarged head portion 22 provided with a semi-spherical cavity 23. The enlarged head portion 22 is provided with a shoulder 24 adapted to rest upon a cut away portion 25 of the tubular portion 15 so as to be freely rotatable thereon, and further, the enlarged head portion 22 is provided with a shoulder 26 adapted to rest upon a stepped portion of the tubular member 15 as at 20. The lower end of the sleeve 21 is seated within an annular recess 28 formed in the base section 11 and is free to rotate therein as is clearly illustrated in Figures 1 and 3. The extreme upper end of the enlarged head 22 is provided with a series of peripheral worm-engaging gear teeth 29 for being engaged by a worm 30 suitably journaled at its ends in a housing 32 formed integral with the outwardly flared portion 17 of the tubular extension 15. The ends of the worm 30 may be provided with polygonal recesses for receiving a wrench or the like when it is desired to rotate the sleeve 21 and annular enlarged head 22.

Slidably mounted within the bore 34 of the sleeve 21 is a clamping block 35 and said clamping block is keyed to the sleeve 21 by means of a key or gib 36. The clamping block 35 is adapted to rotate with the sleeve 21 and is supported for rotation on a spherical bearing member 37 received in a recess 38 formed on the under side or bottom wall of the clamping member 35. The spherical member 37 is adapted to be engaged by a fulcrum bar 38a received in a suitable opening 39 in the base 5 and said bar 38a has one of its ends as at 40 supported on a projection 41 formed at one end of the elongated slot 39. The opposite end of the fulcrum bar 28a is threaded as at 42 for receiving the lower threaded end 43 of a bolt or the like 44. The bolt is rotatably mounted in a bore 45 in the base section 11 and is provided with a head 46 to facilitate rotation thereof when it is desired to clamp the work in a predetermined set or adjusted position. The upper portion of the clamping block 35 is provided with a spherical cavity 47 coextensive with the spherical cavity 23 in the sleeve 21 for receiving a spherical supporting member or ball 48 which is of substantially the same shape as the cavity formed by the spherical recesses 23 and 47.

The spherical recesses 23 and 47 are provided with internal arcuate grooves 49 and 50 respectively which are aligned and are adapted to slidably receive a sector-shaped gear-toothed member 51 having external gear teeth 52. The gear teeth 52 are adapted to ride in the internal slots 49 and 50 in the respective spherical recessed portions 23 and 47 and the intermediate portion of the sector shaped gear member 51 is provided with a projection 53 extending into a slot 54 on the median line of the spherical supporting member 48. The free end of the projection 53 is rounded to engage the side and bottom walls of the groove 54 to allow free rotation of the spherical member 48 about a horizontal axis.

Formed in the clamping block 35 is a bore 55 having annular shoulders 56 adjacent each end thereof for rotatably supporting a worm 57 having spiral threads or teeth 58 adapted to mesh with the teeth 52 on the sector-shaped gear element 51. The enlarged ends 59 of the worm 57 engage the annular shoulders 56 to prevent longitudinal movement of the worm during rotation thereof. Formed in the sleeve 21 at each end of the worm 57 is an aligned bore 60 adapted to register with a circumferential slot 61 formed in the tubular extension 12 so that a wrench or the like with a squared end may be inserted through the slot 61, bore 60 and be received in a polygonal opening 63 formed in the enlarged ends 59 of the worm 57. Thus it will be seen that rotation of the worm 30 and the sleeve 21 about an arc of approximately 45 degrees will likewise rotate the clamping block 35 and worm 57 which is journaled in the annular flanges 56.

The enlarged upper end 22 of the sleeve 21 is provided with a cylindrical portion 64 having graduations thereon as at 65 which are visible through a slot 66 formed in the enlarged upper end portion 17 of the tubular extension 12. In this manner the number of degrees of rotation may be determined by registering the graduations 65 with an indicating mark 67 formed on the peripheral surface of the enlarged portion 17.

The extreme upper end of the enlarged head 22 is chamfered as at 70 for rotatably receiving an adjusting ring 71 which is undercut as at 72 to rotatably fit the chamfered portion 70. The peripheral portion of the ring 71 is provided with worm engaging gear teeth 73 which are adapted to mesh with the teeth of a worm 74, mounted within the housing 32 integrally connected to the outwardly flared upper end 17 of the tubular extension 12. The gear 74 is mounted above the gear 30 and is provided with enlarged ends 75 similar to the worm 30 which are suitably journaled in openings in the integrally formed housing 32. Each enlarged end 75 is provided with a polygonal bore 76 for receiving an adjusting wrench to facilitate rotation of the worm 74 and likewise, rotation of the ring 71. The ring 71 is provided with an internal surface 77 conforming to the spherical shape of the supporting ball 48 to allow free universal movement with respect thereto and formed integral with the adjusting ring 71 is an annular rib 78 having a graduated peripheral surface 79 adapted to be brought into registry with a marking on the outer surface of the enlarged portion 17 of the tubular extension or casting 12. The enlarged portion 17 is slotted as at 80 to allow clear vision of the graduations 79 so that the ring 71 may be rotated any number of predetermined degrees.

Formed on the ring 71 at diametrically opposed locations are bearing bosses 81 in which are journaled opposed shafts 82 to which are secured bevel gears 83 as clearly shown in Figures 2 and 3. The bevel gears 83 are adapted to mesh with gear teeth 84 formed on a bevelled edge of the slot 54 so that rotation of said shaft 82 will be facilitated as by inserting a wrench or the like in polygonal recesses formed in the enlarged ends 85 of the shafts 82. The spherical member 48 will thus be rotated about a horizontal axis independently of the rotation or adjustment imparted thereto by means of the worm 57 when the shafts 82 are at an angle of substantially 90 degrees to the worm 57 and sector-shaped gear 51. The inner ends of the shafts 82 are provided with spherical extensions or projections 86 which engage the side edges of the slot 54 and prevent the gear teeth on the bevel gear 83 from contacting the opposite sides of said slot.

In order to indicate the movement of the spherical supporting member 48 about one of its horizontal axes as by means of the worm 57, the spherical member is graduated as at 88 which may be brought into registry with suitable markings on a retaining ring 89 secured to the enlarged portion 17 of the tubular extension 12. Screws or the like may be passed through the retaining ring 89 and anchored in the enlarged portion 17 to hold the spherical member 48 in position. Similarly, the spherical supporting member 48 is graduated as at 90 so that the degree of rotation thereof effected by the bevel gears 83 may be indicated when the shafts 82 are rotated independently of the worm 57.

The spherical member 48 is formed with an annular enlarged portion 91 having a bore 92 in which is received a thimble 93 projecting beyond the upper surface of the annular enlarged portion 91. A worm wheel 94 is keyed to the annular enlarged portion 91 by means of a pin 95 engaging within opposed openings in the mating faces of the enlarged projection 91 and worm wheel 94. A work supporting table 96 is rotatably supported on the worm wheel 94 and is rotatable upon a retaining screw 97 having its lower threaded end as at 98 threaded in the lower portion of the thimble 93. Formed integral with the under side of the table 96 is a worm housing 99 in which is journaled a worm 100 having spiral teeth 101 engaging and meshing with teeth 102 formed on the worm wheel 94. The worm 100 is journaled in the housing 99 in much the same manner as the worms 57 and 74 to prevent endwise movement thereof and the enlarged ends of the worm 100 as at 103 are provided with polygonal recesses 104 for receiving an adjusting wrench likewise similar to the recesses 33, 63 and 76. The enlarged ends 103 may be graduated as at 105 to provide a vernier adjustment, and it is to be noted that the peripheral surface of a portion of the worm wheel 94 is provided with a marking 106 adapted to register with graduations 107 on a drum portion 108 formed integral with the work supporting table 96.

In the modified form of the invention shown in Figures 5 and 6, the work-holder including the base section 11, tubular extension 12 and enlarged portion 17 thereof is identical to the form of the invention shown in Figures 1 to 4 inclusive. The structure for rotating and adjusting the spherical supporting member 48 is the same as that shown in Figures 1 to 4 inclusive, and the invention in the modified form in Figures 5 and 6 resides in a base member 110 having an annular recess 111 above which is positioned a diaphragm 112 of circular shape so as to be interposed between the flanged portion of the base section 11 and the base member 110. Diametrically disposed lugs 113 are formed on the base section 110 for receiving hold down bolts 114 which are anchored in suitable openings 116 formed in a supporting block 117 which will be hereinafter more fully described. The circular recess 111 provides an air chamber 118 having communication with a compression chamber 119 by means of a duct or passageway 120. A threaded bolt 121 is received in the compression chamber 119 and is suitably threaded therein so that rotation of the bolt by the application of a wrench or the like to the head 122 will cause the air or fluid in the compression chamber 119 to expand the diaphragm 112 and raise or lower the clamping block 35 which projects downwardly within the tubular extension 12.

The angle supporting block 117 is provided with a bottom wall or surface 123, and side walls 124 arranged at an angle of 90 degrees with respect to one another as is clearly shown in Fig. 6. A work holding supporting face or wall 125 connects the hypotenuse edges of the side walls 124 so that the work holder may be bolted to the face 125 and presented to the machine tool or the like at a definitely fixed compound angle. The supporting block 117 may be placed against a vertical support or the like and the work table 96 may be presented to the tool with the spherical supporting member 48 set at its zero markings with respect to the graduations 48 and 90. If desired, the work table 96 may be shifted from the fixed angle by manipulating the various adjusting screws or worms 30, 57, 74 and 100 as well as the adjustment of the bevel gears 83.

The thimble 93 is retained in position by means of a locking pin 126 having a cam-shaped end engaging the outer surface of the thimble, and said locking cam 126 may have one of its ends provided with a kerfed head to facilitate insertion of a screw driver so that the thimble may be released and the table 96 removed as desired, whereby a chuck or other form of work holder may be inserted in the bore 92 in lieu of the work table 96.

*Mode of operation*

After a piece of work to be machined has been placed upon the table 96, the various adjustments are made in accordance with the angle desired by rotating the worms 30, 57, and 74 and in rotating the worms the graduations on the enlarged ends may be used to facilitate fine and accurate adjustment between the markings on the graduated parts 65, 79, 88 and 90 so that minutes of degrees between the graduations may be reached to impart a finer adjustment to the work table than if the graduations 65, 88 and 90 alone were employed. It is obvious that the spherical supporting member 48 may be rocked about a pair of horizontal axes and that each of the axes may be rotated on a vertical axis relative to one another so that the most difficult compound and component angles may be arrived at by simply setting the various graduations in accordance with instructions given to the machinists.

In making adjustments to the spherical supporting member 48 either the worm 57 or one of the bevel gears 83 is rotated to tilt the table about one of the horizontal axes of the spherical supporting member 48. By then rotating the worms 30 or 74 the desired compound angle may be attained and in thus progressing from one adjustment to the other in succession the work table 96 may be presented to the machine tool in a number of various complicated compound angles.

After the spherical supporting member 48 has thus been set at a predetermined compound angle the clamping block 35 is then moved upwardly by means of the fulcrum lever 38 or the diaphragm 112 to frictionally urge the spherical recess 47 into engagement with the spherical surface of the supporting member 48, whereby said spherical supporting member 48 will be locked and the table 96 will be held in its adjusted position.

It is to be understood, that the forms of the invention herewith shown and described are to be taken as preferred embodiments of the invention, and that various changes in the shape, size and arrangement of parts may be resorted to without departing from the spirit of the invention or the scope of the subjoined claims.

I claim:

1. In a universal work holder, a base, a socket portion, a spherical supporting member in the socket portion, means carried by said base engaging said spherical supporting member for rocking the spherical supporting member about a pair of horizontal axes and means for rotating the socket portion of the base to adjust the first mentioned means about a vertical axis.

2. In a universal work holder, a base having a socket portion, a spherical supporting member in the socket, means carried by the base and drivingly engaging the spherical supporting member for rocking the spherical supporting member about a pair of horizontal axes and means for rotating said first-mentioned means and said spherical member on a vertical axis.

3. In a universal work holder, a base, a socket portion mounted in said base for rotation about a vertical axis, a spherical supporting member in the socket, means carried by the socket portion engaging said spherical supporting member for rocking the spherical supporting member about a pair of horizontal axes and means carried by the base for independently rotating the socket portion on a vertical axis.

4. In a universal work holder, a base, a socket rotatably mounted in the base, a spherical supporting member in the socket, means carried by the socket for drivingly engaging said spherical supporting member for rocking the spherical supporting member about a pair of horizontal axes, means for rotating the socket on a vertical axis and means for clamping the spherical supporting member in a pre-set adjusted position.

5. In a universal work holder, a base, a socket member rotatably mounted in the base, a spherical supporting member in the socket, manual means for moving said spherical supporting member for rocking the spherical supporting member about a pair of horizontal axes, means for rotating the socket member on a vertical axis and an adjustable work table supported on the spherical supporting member.

6. In a universal work holder, a base, a socket member mounted on said base, a spherical support located in said socket member, manual means for moving said spherical supporting member for rocking and adjusting the spherical support about a horizontal axis, manual means carried by the socket member for moving the spherical supporting member for rocking and adjusting said spherical member about another horizontal axis and means for independently rotating said socket member about the vertical axis of the spherical supporting member to adjust the angular relationship between the component movements of said spherical supporting member on said horizontal axes.

7. In a universal work holder, a base, a rotatable socket member carried by the base, a spherical support mounted in said socket for universal movement, a clamping block slidably mounted in the socket member adapted to engage said spherical supporting member and lock the same against movement, means in the clamping block for engaging and adjusting the spherical support on a horizontal axis, means carried by the socket member engaging said spherical supporting member for turning and adjusting the spherical supporting member on another horizontal axis and means carried by the base for rotating the socket member about a vertical axis of the spherical supporting member.

8. In a universal work holder, a base, a rotatable socket member carried by the base, a spherical supporting member mounted in said socket for universal movement, a clamping block slidably mounted in the socket member engageable with the spherical supporting member to lock the same against movement, means in the clamping block drivingly engaging the spherical supporting member for turning and adjusting the spherical supporting member on a horizontal axis, means carried by the socket member drivingly engaging the spherical supporting member for turning and adjusting the spherical supporting member on another horizontal axis and means for rotating the socket member and the last mentioned means about an axis perpendicular to the base.

9. In a universal work holder, a base, a rotatable socket member carried by the base, a spherical support mounted in said socket for universal movement, a clamping block slidably mounted in the socket member engageable with said spherical support to lock the same in an adjusted position, means in the clamping block drivingly engaging the spherical support for turning and adjusting the spherical support on a horizontal axis, means carried by the socket member drivingly engaging the spherical support for turning and adjusting the spherical support on another horizontal axis, means for rotating the socket member and the last mentioned means carried by the socket member and means for moving said clamping block into engagement with the spherical member to retain the same in an adjusted position.

10. In a universal work holder, a base, a rotatable socket member carried by the base, a spherical support mounted in said socket for universal movement, a clamping block slidably mounted in the socket member, a sector shaped gear mounted in the socket member having a projection extending into a groove in the spherical supporting member, a worm carried by the clamping block for oscillating said sector gear and turning the spherical supporting member on its horizontal axis, a gear supporting ring rotatably mounted on the socket member, a pair of bevel gears on the ring at diametrical opposed points meshing with gear teeth formed on the edge of the slot in the spherical supporting member for adjusting the same on another horizontal axis and means for rotating and adjusting said gear supporting ring.

11. In a universal work holder, a base, a rotatable socket member carried by the base, a spherical support mounted in said socket for universal movement, a clamping block slidably mounted in the socket member, a sector shaped gear mounted in the socket member having a projection extending into a groove in the spherical supporting member, a worm carried by the clamping block for oscillating said sector gear and turning the spherical supporting member on its horizontal axis, a gear supporting ring rotatably mounted on the socket member, a pair of bevel gears on the ring at diametrical opposed points meshing with gear teeth formed on the edge of the slot in the spherical supporting member for adjusting the same on another horizontal axis, a worm gear for rotating said socket member and a worm gear for rotating said gear supporting ring, whereby said spherical supporting member may be adjusted about its vertical axis.

12. In a universal work holder, a base, a rotatable socket member carried by the base, a spherical support mounted in said socket for universal movement, a clamping block slidably mounted in the socket member, a sector shaped gear mounted in the socket member having a projection extending into a groove in the spherical supporting member, a worm carried by the clamping block for oscillating said sector gear and turning the spherical supporting member on its horizontal axis, a gear supporting ring rotatably mounted on the socket member, a pair of bevel gears on the ring at diametrical opposed points meshing with gear teeth formed on the edge of the slot in the spherical supporting member for adjusting the same on another horizontal axis, and projections carried by said bevel gears extending into said slot on diametrical opposed sides of the spherical supporting member, whereby rotation of said adjusting ring will rotate the spherical supporting member about its vertical axis.

13. In a universal work holder, a base, a rotatable socket member carried by the base, a spherical support mounted in said socket for universal movement, a clamping block slidably mounted in the socket member, a sector shaped gear mounted in the socket member having a projection extending into a groove in the spherical supporting member, a worm carried by the clamping block for oscillating said sector gear and turning the spherical supporting member on its horizontal axis, a gear supporting ring rotatably mounted on the socket member, a pair of bevel gears on the ring at diametrical opposed points meshing with gear teeth formed on the edge of the slot in the spherical supporting member for adjusting the same on another horizontal axis and means for moving said clamping block into engagement with the spherical supporting member to retain the same in a predetermined position.

14. In a universal work holder, a base, a rotatable socket member carried by the base, a spherical support mounted in said socket for universal movement, a clamping block slidably mounted in the socket member, a sector shaped gear mounted in the socket member having a projection extending into a groove in the spherical supporting member, a worm carried by the clamping block for oscillating said sector gear and turning the spherical supporting member on its horizontal axis, a gear supporting ring rotatably mounted on the socket member, a pair of bevel gears on the ring at diametrical opposed points meshing with gear teeth formed on the edge of the slot in the spherical supporting member for adjusting the same on another horizontal axis and fluid pressure means for moving the clamping block into engagement with the spherical supporting member whereby said spherical supporting member may be retained in a pre-adjusted position.

15. In a universal work holder, a base, a rotatable socket member carried by the base, a spherical support mounted in said socket for universal movement, a clamping block slidably mounted in the socket member, a sector shaped gear mounted in the socket member having a projection extending into a groove in the spherical supporting member, a worm carried by the clamping block for oscillating said sector gear and turning the spherical supporting member on its horizontal axis, a gear supporting ring rotatably mounted on the socket member, a pair of bevel gears on the ring at diametrical opposed points meshing with gear teeth formed on the edge of the slot in the spherical supporting member for adjusting the same on another horizontal axis and a screw operated member for moving the clamping block into engagement with the spherical supporting member whereby said spherical supporting member will be locked in a pre-adjusted position.

16. In a universal work holder, a base, a rotatable socket member carried by the base, a spherical support mounted in said socket for universal movement, a clamping block slidably mounted in the socket member, means in the clamping block for turning and adjusting the spherical support on a horizontal axis, means carried by the socket member for turning and adjusting the spherical supporting member on another horizontal axis, means for rotating the socket member about a vertical axis of the spherical supporting member and a triangular supporting block for said base having an angular supporting face on a compound angle.

17. In a universal work holder, a base, a rotatable socket member carried by the base, a spherical support mounted in said socket for universal movement, a clamping block slidably mounted in the socket member, means in the clamping block for turning and adjusting the spherical support on a horizontal axis, means carried by the socket member for turning and adjusting the spherical supporting member on another horizontal axis, means for rotating the socket member about a vertical axis of the spherical supporting member and a supporting block for said base having a pair of triangular walls extending at right angles to one another with a supporting face connecting the hypotenuses of said triangular walls whereby to provide a surface having a compound angle as a resultant of the component angles of said walls.

18. In a universal work holder, a base, a rotatable socket member carried by the base, a spherical support mounted in said socket for universal movement, a clamping block slidably mounted in the socket member, means in the clamping block for turning and adjusting the spherical support on a horizontal axis, means carried by the socket member for turning and adjusting the spherical supporting member on another horizontal axis, means for rotating the socket member about a vertical axis of the spherical supporting member and a series of graduations on the spherical supporting member to determine the angular position of work supported by the spherical supporting member.

19. In a universal work holder, a base, a rotatable socket member carried by the base, a spherical support mounted in said socket for universal movement, a clamping block slidably mounted in the socket member, means in the clamping block for turning and adjusting the spherical support on a horizontal axis, means carried by the socket member for turning and adjusting the spherical supporting member on another horizontal axis, means for rotating the socket member about a vertical axis of the spherical supporting member and a rotatable work table supported by said spherical supporting member adapted to be adjusted to various positions with respect to the spherical supporting members.

20. In a universal work holder, a base, a rotatable socket member carried by the base, a spherical support mounted in said socket for universal movement, a clamping block slidably mounted in the socket member, a sector shaped gear mounted in the socket member having a projection extending into a groove in the spherical supporting member, a worm carried by the clamping block for oscillating said sector gear and turning the spherical supporting member on its horizontal axis, a gear supporting ring rotatably mounted on the socket member, a pair of bevel gears on the ring at diametrical opposed points meshing with gear teeth formed on the edge of the slot in the spherical supporting member for adjusting the same on another horizontal axis, a worm for rotating said bevel gear supporting ring independent of the socket member, graduations on the spherical supporting member, socket member and gear supporting ring and vernier graduation marks on the respective control elements of said spherical supporting element, socket member and gear supporting ring.

H. LEWIS COLLINS.